United States Patent
Kawan et al.

(10) Patent No.: US 8,117,125 B1
(45) Date of Patent: Feb. 14, 2012

(54) METHOD AND SYSTEM FOR CONTROLLING CERTIFICATE BASED OPEN PAYMENT TRANSACTIONS

(75) Inventors: Joseph C. Kawan, Hollywood, CA (US); Ronald King-Hang Chu, Los Angeles, CA (US); Charles Golvin, Los Angeles, CA (US); Peter Tompkins, Malibu, CA (US)

(73) Assignee: Citicorp Developement Center, Inc., Los Angeles, CA (US)

( * ) Notice: Subject to any disclaimer, the term of this patent is extended or adjusted under 35 U.S.C. 154(b) by 108 days.

(21) Appl. No.: 09/588,902

(22) Filed: Jun. 9, 2000

Related U.S. Application Data

(60) Provisional application No. 60/138,607, filed on Jun. 11, 1999.

(51) Int. Cl.
*G06Q 40/00* (2006.01)
(52) U.S. Cl. ............... 705/40; 705/35; 705/39
(58) Field of Classification Search ........... 705/41, 705/35, 39, 40, 38
See application file for complete search history.

(56) References Cited

U.S. PATENT DOCUMENTS

| | | | | |
|---|---|---|---|---|
| 4,736,094 A | 4/1988 | Yoshida | | 235/379 |
| 4,891,503 A | 1/1990 | Jewell | | 235/380 |
| 5,036,461 A | 7/1991 | Elliott et al. | | 364/408 |
| 5,475,758 A | 12/1995 | Kikuchi | | 380/25 |
| 5,511,121 A | 4/1996 | Yacobi | | 380/24 |
| 5,649,118 A | 7/1997 | Carlisle et al. | | 395/241 |
| 5,671,279 A * | 9/1997 | Elgamal | | 705/79 |
| 5,677,955 A * | 10/1997 | Doggett | | 380/24 |
| 5,721,781 A | 2/1998 | Deo et al. | | 380/25 |
| 5,754,656 A | 5/1998 | Nishioka et al. | | 380/25 |
| 5,790,677 A | 8/1998 | Fox et al. | | 380/24 |
| 5,883,810 A | 3/1999 | Franklin et al. | | 364/479.02 |
| 5,931,917 A | 8/1999 | Nguyen et al. | | 709/250 |
| 5,933,816 A | 8/1999 | Zeanah et al. | | 705/35 |
| 5,953,422 A | 9/1999 | Angelo et al. | | 380/23 |
| 5,974,146 A | 10/1999 | Randle et al. | | 380/24 |
| 5,999,624 A | 12/1999 | Hopkins | | 380/24 |
| 6,003,014 A | 12/1999 | Lee et al. | | 705/13 |
| 6,081,790 A * | 6/2000 | Rosen | | 705/40 |
| 6,085,321 A * | 7/2000 | Gibbs | | 713/170 |
| 6,108,644 A * | 8/2000 | Goldschlag | | 705/69 |
| 6,317,729 B1 * | 11/2001 | Camp | | 705/79 |
| 2001/0018660 A1 * | 8/2001 | Sehr | | |

FOREIGN PATENT DOCUMENTS

JP 63-313288 A 12/1988

* cited by examiner

*Primary Examiner* — Lalita Hamilton
(74) *Attorney, Agent, or Firm* — Eric L. Sophir; SNR Denton US LLP

(57) ABSTRACT

Methods and systems for controlling certificate-based open payment transactions involving a merchant and a customer utilizing various types of networks and terminals. Prior to accessing a merchant POS terminal or, for example, a merchant website, a customer obtains a certificate from a service provider (SP), such as a bank, certifying his identification (ID) and his relevant financial information, in a form that is understandable by the SP. The SP is capable of performing multiple functions. For example, the SP is capable of acting as a certificate authority when it issues the customer's certificates, an authenticator when it receives private-key encrypted certificates from the customers to be decrypted using the corresponding public-key, and an authorizing authority when it checks the value available in a customer' chosen payment account against the requested purchase or transfer amount.

22 Claims, 7 Drawing Sheets

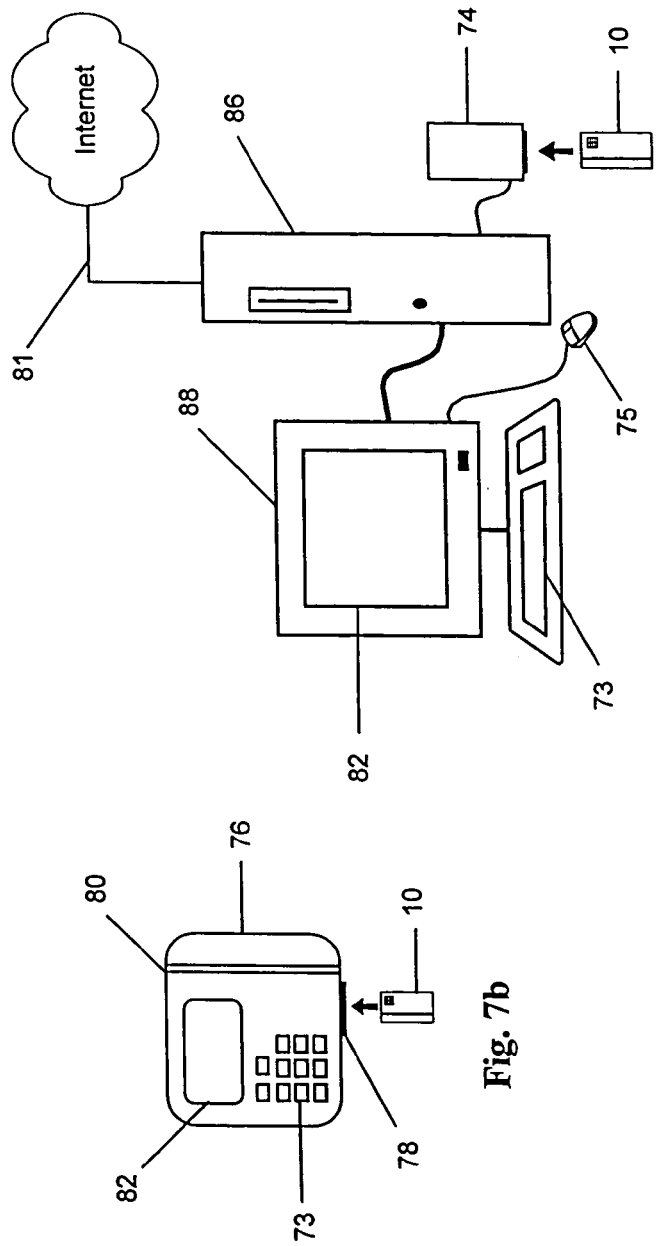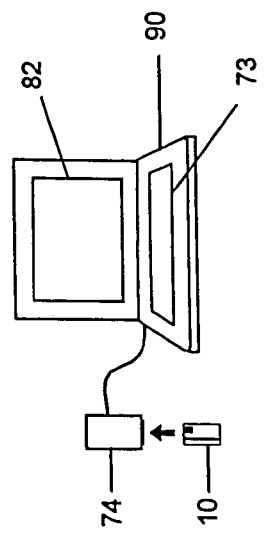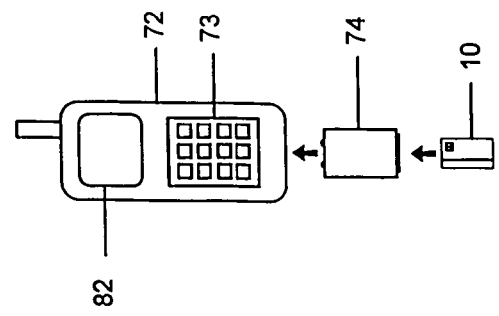

METHOD AND SYSTEM FOR
CONTROLLING CERTIFICATE BASED OPEN
PAYMENT TRANSACTIONS

CROSS-REFERENCE TO RELATED
APPLICATIONS

This application hereby claims priority to commonly-owned provisional application No. 60/138,607, filed Jun. 11, 1999, entitled "Certificate-Based Credit Account," which is incorporated herein by reference in its entirety.

BACKGROUND OF THE INVENTION

1. Field of the Invention

The invention of this disclosure is drawn generally to methods and systems for facilitating financial transaction over various networks. More particularly, the invention of this disclosure is drawn to methods and systems for transacting over public and private networks utilizing an identifying certificate from a smart card.

2. Description of Related Art

With the current exponential growth in the number of Internet users comes an equal amount of growth in the number of buyers and sellers seeking to do electronic-type business. In accordance with the average customer's expectation of having shopping at his/her fingertips, is the customer's equally high expectation that payment should be quick and easy and expense should be minimized. Unfortunately, the current methods of purchasing and paying for goods and/or services either, for example, over the Internet via point-of-service (POS) terminals, personal computers (PCs), personal digital assistants (PDAs), set-top boxes or wireless devices, involve significant transaction costs. These transaction costs include fees paid by the merchant to credit verification companies and the risk of fraud, borne by both the merchant and customer when using current payment schemes. Consequently, a key issue that is currently driving the electronic commerce industry is security.

A first conventional method of transacting business over the public networks involves a merchant, a customer, and an account servicer. In practicing this method, the account servicer provides hardware and/or software to the customer that includes credit or debit information and a public key encryption file. The customer then may use the hardware or software, to make a purchase over an unsecured network, such as the Internet. When the customer inserts the hardware into an appropriate reader or runs the software, the customer's purchase information is encrypted with a public key from the public key file and is sent to the merchant. The merchant is not in possession of the private key and consequently, cannot read the encrypted file information, such as the customer's credit card number. The merchant then adds his own purchase information and forwards the entire encrypted message to the account servicer for authorization to proceed with the transaction. The account servicer then decrypts the message with the appropriate private key and informs the merchant as to whether or not to proceed with the transaction. This method of transacting still uses the existing credit card verification infrastructure.

A second conventional method of doing business between a customer and a merchant, whether from a POS terminal or from a PC, via the Internet, requires multiple parties including at least the merchant, a merchant acquirer, a credit card account issuer, a merchant bank and of course, the consumer. In some instances, another bank, a customer's bank, separate from the credit card account issuer, is also a party. In practicing this method, a customer would, for example, enter a website for a product that the customer wishes to purchase and enters name, address, product information, and credit card number and expiration. This information will go through a merchant acquirer who the merchant pays to handle the authorization of credit card transactions. This merchant acquirer probably represents hundreds of merchants and handles all of their transactions by just sorting through the purchase requests from customers, finding which credit card issuers need to be contacted for authorization and performing the authorization. For example, there are a number of different credit cards available to consumers such as MasterCard™, Visa™, Discover™, and Diners Club™, each one of which may require a separate line for authorization. The merchant acquirer gets paid by the merchant to handle all of the sorting and sending through the conventional credit authorization lines. After the credit card transaction is authorized, the merchant must further deal with the settlement network in order to actually see his account credited while the credit card holder's account is debited. There are many transaction costs involved in this method of transacting electronically. Each of these transactions, in addition to the assumptions of liability, are reflected in the prices charged to customers. Further, there is still a security issue involved since there are multiple parties who are dealing with the customer's credit card information.

A third method of making a purchase over a network involves the use of electronic funds transfer instruments, commonly referred to as electronic checks. In practicing this method of transacting electronically using electronic funds transfer instruments, the customer obtains software which allows him to create an electronic check either in response to the receipt of an authenticated payment request from a merchant or on his own volition. In all instances, the parties involved hold the necessary public keys to decrypt the private key encrypted digital signatures and certificates of each of the other parties. So, when the customer sends the digitally signed electronic check to the merchant, along with a certificate issued by the customer's bank and appropriate account, the merchant utilizes a public key to decrypt the information. Once satisfied with the information, the merchant digitally endorses the electronic check and appends his own banking information to the check and deposits the check with his own bank. The merchant's bank must then institute conventional clearing procedures and eventually return the processed electronic check to the customer's bank, for further settlement procedures on that end. In short, this method of electronic check payment, while adding an element of convenience, still requires the same clearing and settlement procedures as are necessary for the processing of "paper checks." Further, the customer's personal financial information is bounced around among a number of parties, along multiple private and public networks, the latter being quite susceptible to "electronic break-ins" resulting in increased occurrences of fraud.

It would be advantageous to minimize the transaction costs associated with current payment schemes and to limit the number of parties who are privy to the personal financial information of the customer, as well as the merchant, during electronic transactions. The lowering of a merchant's costs of doing business will be reflected in the price charged to the customer for the desired goods and/or services.

SUMMARY OF THE INVENTION

Generally, the preferred embodiments of the present invention comprise methods and systems for controlling certificate-based open payment transactions involving a merchant and a customer utilizing various types of networks and terminals. In the preferred embodiments, prior to accessing a merchant POS terminal or, for example, a merchant website, a customer obtains a certificate from a service provider (SP), such as a bank, certifying his identification (ID) and his relevant financial information, in a form that is understandable by the SP. The SP is capable of performing multiple functions. For example, the SP is capable of acting as a certificate authority when it issues the customer's certificates, an authenticator when it receives private-key encrypted certificates from the customers to be decrypted using the corresponding public-key, and an authorizing authority when it checks the value available in a customer' chosen payment account against the requested purchase or transfer amount. In other examples, the SP does not perform the authorization but instead consults with an outside authorization authority (e.g., a customer's financial institution).

In the following embodiments, the certificate issued by the SP is located on a piece of hardware, generically referred to as a smart card. When this certificate is accessed by the customer at the POS terminal or through a PC, PDA or wireless device (e.g., telephone, set-top box) in response to a payment request by a participating merchant, the SP recognizes the information originally certified by them as well as additional purchase information and merchant ID information. The SP then authenticates the certificate and merchant ID information (e.g., payment method and amount) and either performs the authorization itself or obtains authorization from the appropriate financial institution and notifies the merchant that the payment amount will be deposited into the merchant's specified account. The merchant is able to validate the SP's promise to pay and release the goods since the merchant possesses the SP's public key and is thus able to unlock messages from the SP that are signed with SP's private key. Additionally, the certifying authority may request some form of merchant response to the notification prior to performing the deposit.

A first particular embodiment described in further detail below is a method for facilitating a financial transaction over a first network. The method includes issuing a programmable memory device to a first user. The programmable memory device contains at least the following for formulating payment instructions, network address instructions for an issuer of the programmable memory device, a first user's digital certificate, a first user's financial account information, and an encryption program. The method also includes issuing software to a second user. The software includes payment information of the second user including a second user's financial account information. The software is capable of interacting with the programmable memory device over the first network. A connection is formed between the programmable memory device and the software and the payment instructions are received via the connection. The second user's payment information is added to the payment instructions. The payment information and the payment instructions are routed to the issuer utilizing the network address instructions and the issuer is capable of accessing at least one of the first user's financial account information and a second user's financial account information.

A second particular embodiment described in detail below is a system for facilitating financial transactions over a network. The system includes a programmable memory device including at least an identifying certificate, payment information, network routing instructions and an encryption program. The system further includes a first server for offering at least one product via the network through a terminal and a processor connected to the terminal. The processor is used for (a) accessing the programmable memory device, (b) retrieving the identifying certificate, the payment information, the network routing instructions and the encryption program off of the programmable memory device, (c) attaching the identifying certificate to the payment information, (d) encrypting the payment information with the attached identifying certificate via the encryption program, and (e) sending the payment information with the attached identifying certificate across the network via the network routing instructions. A second server connected to the network for (f) receiving the encrypted payment information with the attached identifying certificate, (g) decrypting and reading the encrypted payment information with the attached identifying certificate, (h) authorizing a payment requested via the payment information, and (g) notifying the first server of the authorization.

A third particular embodiment described in detail below is a method for performing a financial transaction. The method includes presenting a customer with an amount due in response to a customer's product selection, accepting a customer's programmable memory device within a reader portion of a terminal to facilitate payment of the amount due, accessing a portion of the customer's programmable memory device containing payment information. The payment information includes at least network address instructions for an issuer of the customer's programmable memory device, a digital certificate for identifying the customer, the customer's financial account information, an encryption program, and a customer memo balance containing updated customer account balances. The customer is identified through the digital certificate. A customer's account selection is received and the customer's memo balance is checked for the selected account to determine if funds therein are sufficient to pay the amount due. The payment information from the programmable memory device is downloaded to a memory portion of the terminal and stored for future processing of the financial transaction. The selected product is released to the customer and the payment information is uploaded to the issuer of the programmable memory device for further processing and settlement of the financial transaction.

A fourth particular embodiment described in detail below is a system for performing a financial transaction. The system includes means for presenting a customer with an amount due in response to a customer's product selection, means for accepting a customer's programmable memory device within a reader portion of a terminal to facilitate payment of the amount due, and means for accessing a portion of the customer's programmable memory device containing payment information. The payment information includes at least network address instructions for an issuer of the customer's programmable memory device, a digital certificate for identifying the customer, the customer's financial account information, an encryption program, and a customer memo balance containing updated customer account balances. The system also includes means for identifying the customer through the digital certificate, means for receiving a customer's account selection, means for checking a customer's memo balance for the selected account to determine if funds therein are sufficient to pay the amount due, means for downloading the payment information from the programmable memory device to a memory portion of the terminal, means for storing the payment information from the programmable memory device in a memory portion of the terminal for future processing of the financial transaction, means for releasing the selected product to the customer, and means for uploading the payment information to the issuer of the programmable memory device for further processing and settlement of the financial transaction.

A fifth particular embodiment described in detail below is a system for facilitating a financial transaction. The system includes a programmable memory device issued to a user. The programmable memory device includes (a) at least one processor, (b) a digital certificate for identifying the user, (c) the user's financial account information, (d) network addressing instructions for at least the issuer of the programmable memory device, and (e) an encryption program for encrypting at least (b) and (c). The system also includes a terminal for reading information from the programmable memory device to facilitate a payment from at least one of a user's financial accounts and a server for receiving information from the terminal read from the programmable memory device and authorizing payment from at least one of the user's financial accounts.

BRIEF DESCRIPTION OF THE DRAWINGS

In the drawings:

FIGS. 7a-7d are diagrams of terminals used in practicing a preferred embodiment of the present invention.

DETAILED DESCRIPTION OF THE PREFERRED EMBODIMENTS

Figure 1:
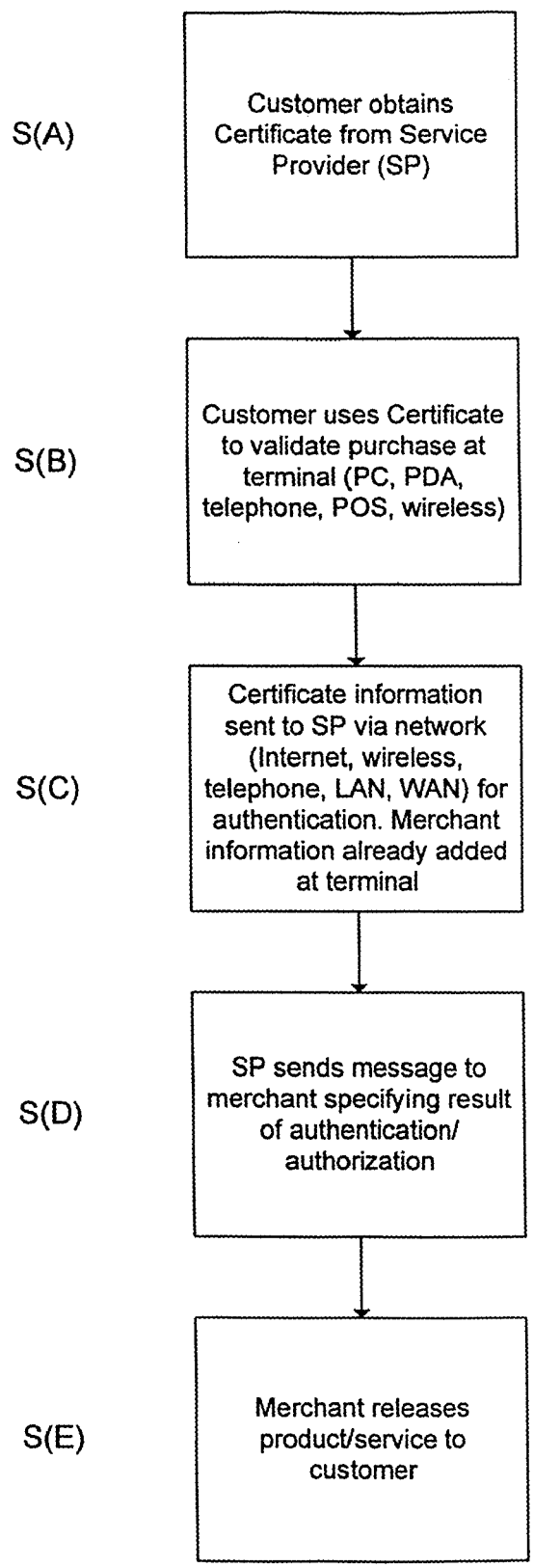
FIG. 1 is a block diagram of an application of the invention.

Generally, in the preferred embodiments of the present invention as seen in FIG. 1, a customer requests a certificate from a service provider (SP) S(A), that is embodied in a piece of hardware, such as a smart card (discussed below). The SP may be the customer's own financial institution (e.g., bank) or it may be subscribed to by the customer's third party financial institution. The certificate is used by the customer when away from his financial institution, to identify himself to the financial institution when he is making a purchase at a compatible terminal S(B). Consequently, the certificate represents identifying information about the customer. In particular, the identifying information represents the financial relationship between the SP and the customer in the case where the SP is also the holder of the customer's accounts. Alternatively, the certificate may represent identifying information about the financial relationship between a third-party financial institution and the customer and the payment preferences of the customer.

Further, in the preferred embodiments, when the customer attempts to use the certificate on his smart card, all relevant purchase information is sent directly to the SP for authentication, with little or no actual merchant intervention S(C). Depending on the terminal being used, all merchant information is generally added automatically, without the need for the merchant to intervene. This is accomplished via a software program within the terminal. Alternatively, the merchant information may already be part of the payment vehicle at the time the customer adds his/her payment information as in the case of, for example, a web-based transaction. Once the SP authenticates and authorizes the information, a message regarding the authentication/authorization is transmitted to the merchant, allowing the merchant to proceed or cancel the transaction S(D). If authentication and authorization are positive, the merchant releases the goods and/or services to the customer, without delay S(E).

Figure 2A:
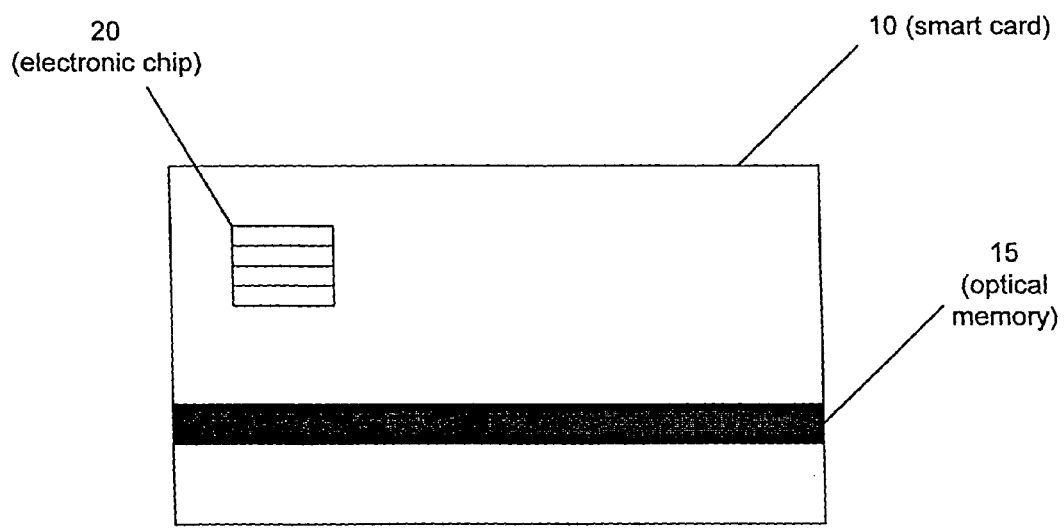
FIGS. 2a-2b are diagrams of a smart card used in practicing the invention.
Figure 2B:
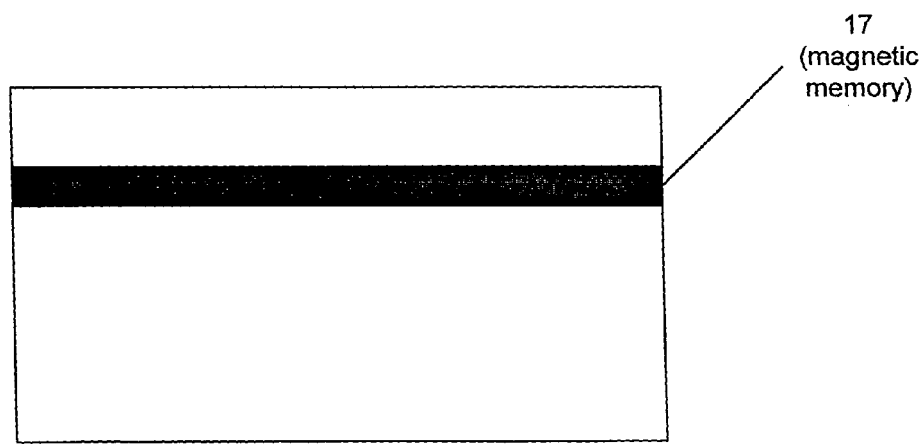
Figure 3:
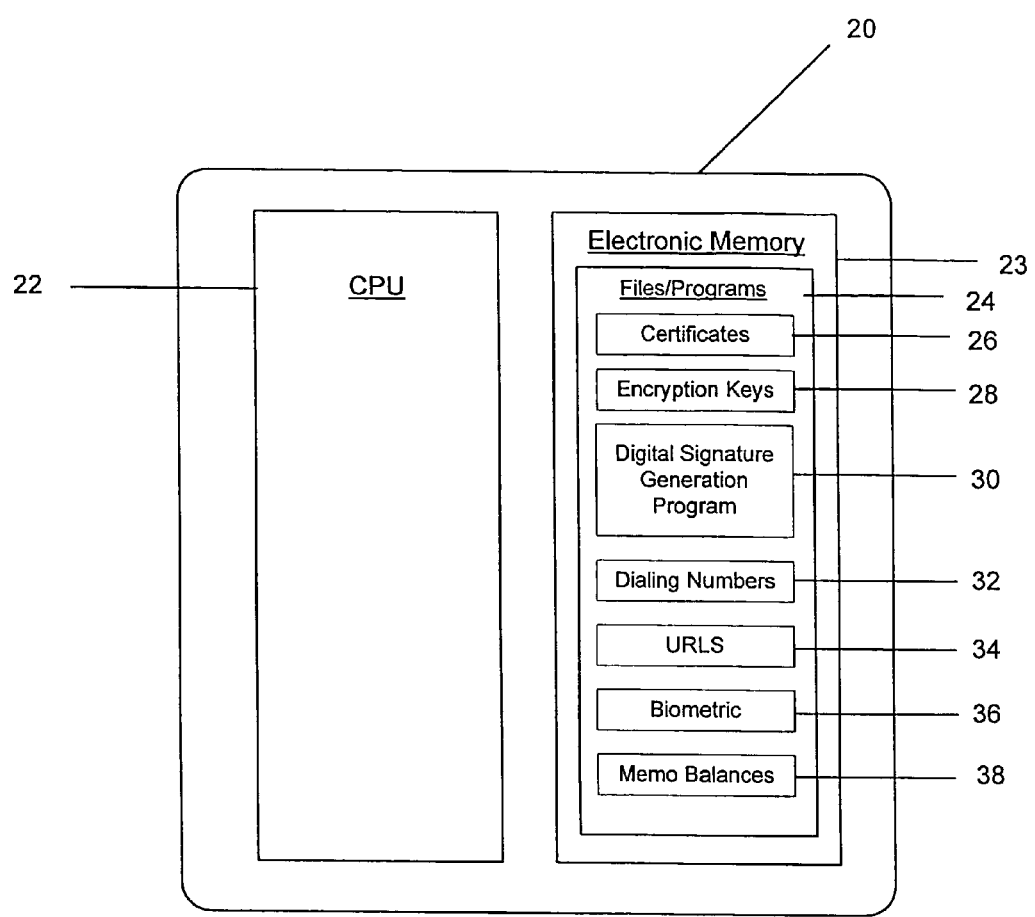
FIG. 3 is a diagram of the electronic memory of a smart card used in practicing the invention.

The smart cards of today have larger memories (e.g., ROM, RAM, EEPROM, Flash), as well as constantly increasing and improving processing power, making them ideal pieces of hardware to be used for network-type transactions. In FIGS. 2a-2b and 3, the smart card 10 contemplated by the present invention holds the certificates 26 (discussed below) issued by the SP. In the preferred embodiments these certificates 26 may be stored in any appropriate electronic memory 23, preferably a non-volatile reprogrammable memory such as, EEPROM or Flash, within the electronic chip 20 within the smart card 10 as well as in an optical memory 15 and/or a magnetic memory 17, should these be available on the smart card 10. Further, the electronic memory 23 is capable of storing other large files/programs 24 such as biometric identifying information 36, a digital signature generation program 30, and memo balances 38 as well as the on-card generated encryption keys 28 used to encrypt any or all of these files for security. The memo balances 38 may represent multiple transactions for multiple accounts tracked by the smart card. Review of these memo balances 38 prior to making a purchase or transferring value allows the customer to make an informed decision regarding which account to use in which situation. Of particular importance for a number of the preferred embodiments described below, is the capability of the smart card 10 to retain in at least one of its multiple memories, particular dialing numbers (e.g., phone numbers) 32 or Internet Universal Resource Locators (URLs) 34 in order to enable direct contact with the SP on-line, when making purchases over the appropriate networks. The encryption keys are attached via the central processing unit (CPU) 22, also located within the smart card 10. Once in possession of a certificate 26, the customer may transfer the certificates 26 onto the hard drive of his PC or other appropriate device from the memories of the smart card 10, for future retrieval without the need for the smart card 10. The certificate 26 may then be used for identification purposes.

Now that the customer is in possession of the appropriate hardware, i.e., the smart card, containing all relevant customer data, he can make a purchase with the smart card over a variety of networks, terminals and servers.

Figure 5:
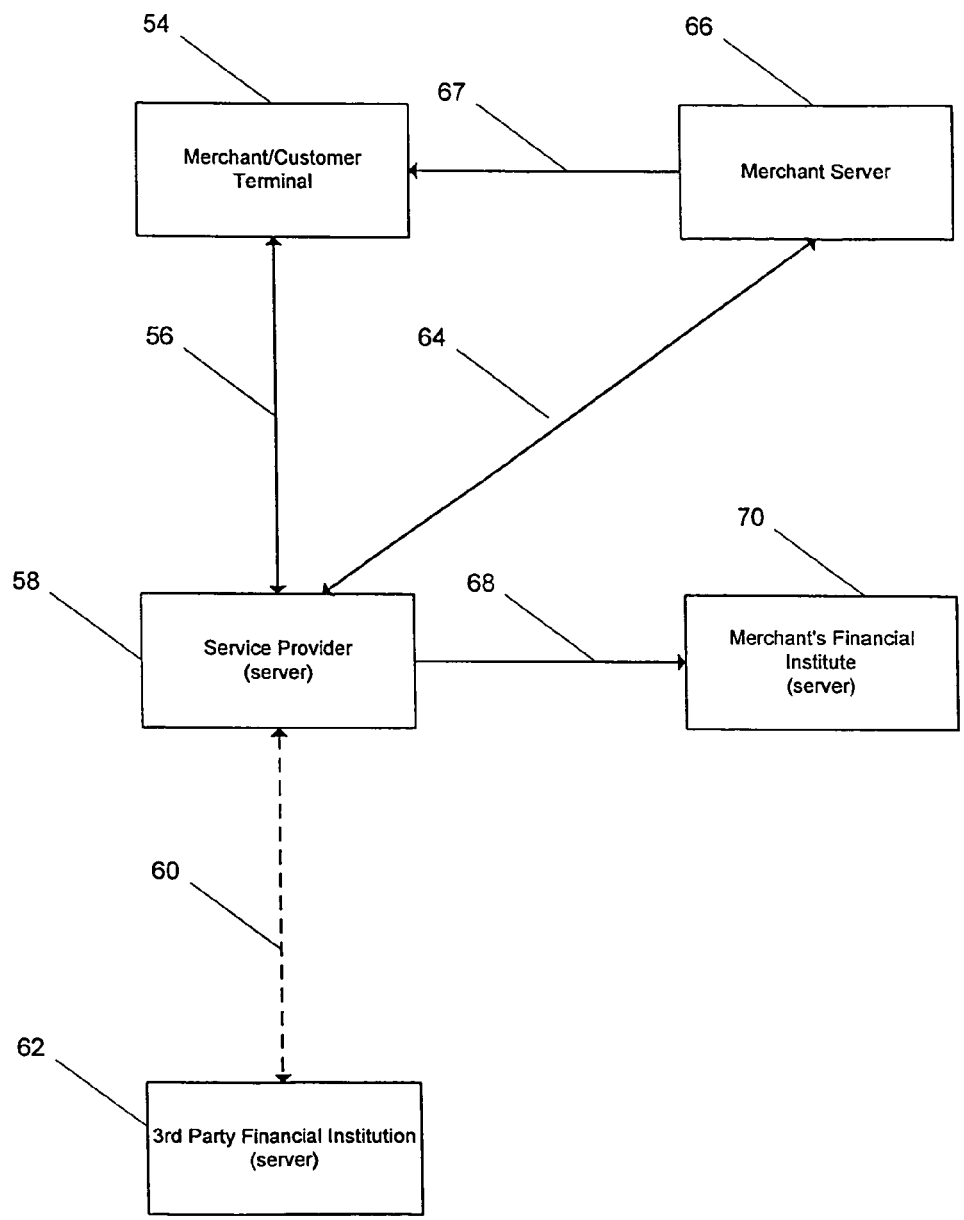
FIG. 5 is a block diagram of the system used in a preferred embodiment of the invention.

Referring to FIG. 5, when attempting to make a purchase from a participating merchant, the customer inserts the smart card into an appropriate reader at a POS terminal or through a reader connected to his PC, PDA, or a wireless device (e.g., cellular phone, set-top box, or similar portable terminal) or he retrieves the certificate from his hard drive and sends it to the merchant/customer terminal 54. The certificate is transmitted via conventional transmission lines (e.g., telephone or Internet) or a wireless network 56 to the SP. The SP receives the transmitted certificate and other relevant information through a specified server 58. After decrypting, authenticating and authorizing the certificate and attached information, the SP sends results (e.g., promise to pay or denial of payment) to the merchant via any of a number of conventional transmission lines or networks 64. The merchant may receive and read the results via its' server 66 and if necessary, transmit notification of goods being shipped or delivered or in the case of Internet services, provide the service to the customer via the Internet 67. The merchant is able to read the results sent by the SP with the use of the SP's public key. If necessary, the SP utilizes the Internet or other appropriate line of communication 60, to interact with the customer's third party financial institution. The third party financial institution has an appropriate receiver/transmission network and server 62 for handling the incoming communications from the SP 58. Similarly, the SP uses the automated clearing house (ACH) lines 68 to transmit and receive clearing and settlement communications to and from the merchant's financial institution 70. The merchant's financial institution is equipped with a server that is capable of receiving and transmitting information along at least the ACH lines 68.

The following represent specific procedural and systematic examples embodying the preferred embodiment of the present invention.

Figure 4:
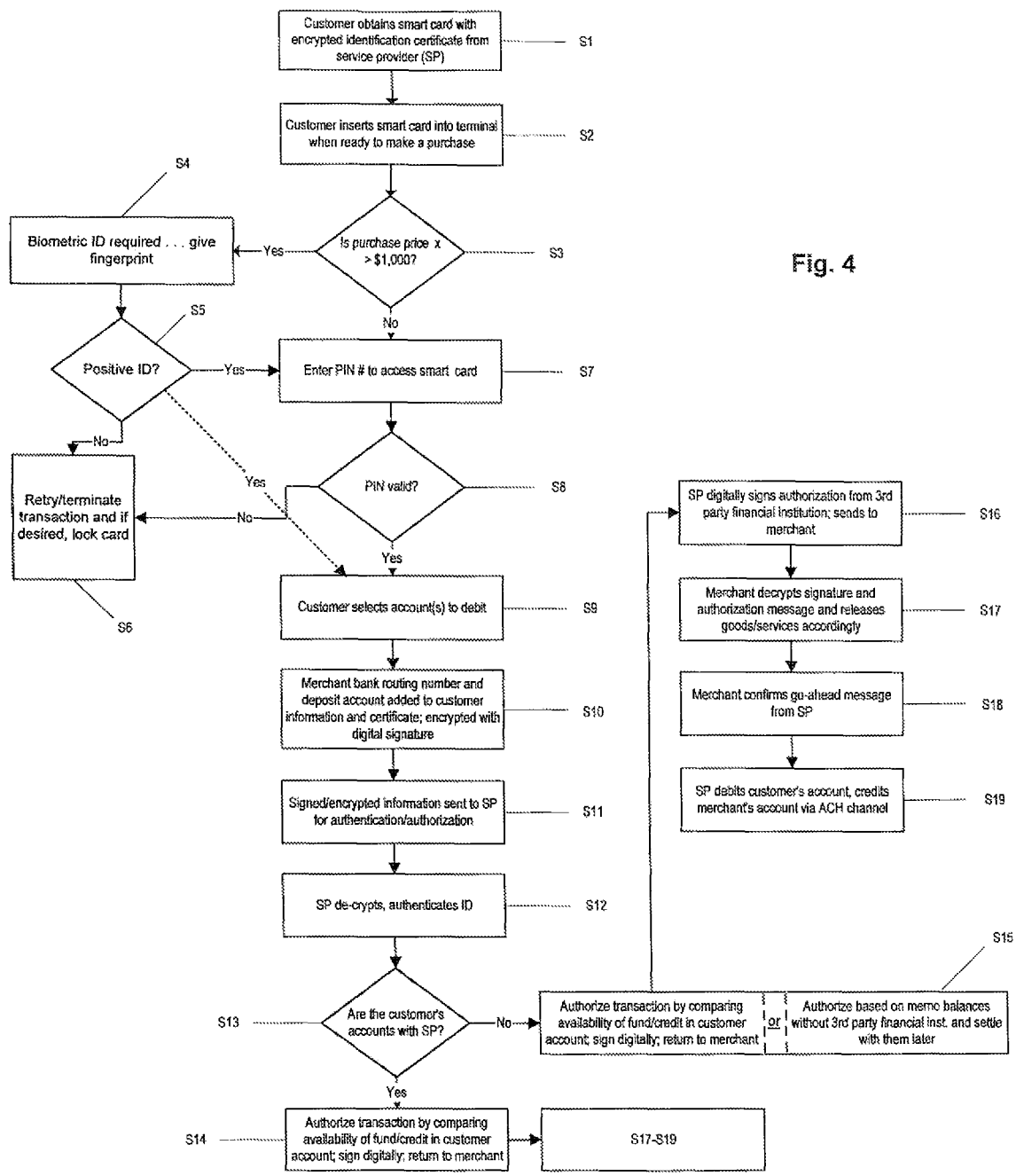
FIG. 4 is a block diagram of a first embodiment of the invention.

Referring to FIG. 4, in a first specific example, a customer obtains a smart card encrypted with a certificate from the SP, S1 and attempts to make a purchase at a POS merchant terminal. By way of example, the customer's smart card contains an identification certificate which includes the SP's digital signature that is secured on a first-level by encryption via public key cryptography (PKC) and is further secured on a second-level by a PIN lock. If necessary, a smart card could be programmed to individually lock any number of applications within the smart card with a PIN. The smart card itself may be secured by a PIN lock and/or biometric lock, adding a third and possibly, fourth level of security. The smart card could be programmed to require biometric authentication only when the customer attempts to make a purchase for value exceeding a set amount, for example $1,000. Additionally, the smart card contains the dialing number and URL for the SP, a menu for selecting which account he wishes to debit, and memo balances for informing the customer or merchant of the value amounts in each of his available accounts.

The merchant subscribes to the certificate-based open payment transaction system and has loaded the appropriate software and/or hardware into the POS terminal. This software is not complicated and in most cases need only consist of a file containing the public keys of the SP so as to be capable of decrypting, authenticating, and authorizing messages received from the SP under a PKC security system. The POS terminal may be fixed or stationary, as in the case where it is located at an actual retail location or it may be portable, as in the case where merchants are selling concessions at say, a sporting event. Further, the POS terminal may be currently on-line or off-line.

When the customer attempts to pay through a stationary, on-line terminal using his smart card, the merchant requests payment and the customer inserts his smart card into the smart card reader portion of the merchant terminal S2. The reader recognizes the certificate and other purchase facilitating data in the memory or memories of the smart card. If the purchase price exceeds $1,000, biometric authentication is required and the customer will be asked to provide such information, e.g., a fingerprint S3-S5. Similarly, once the biometric authentication has been performed, if in addition there is a PIN lock on the smart card as in this specific example, the customer is prompted or requested to enter such information through, for example, a graphical user interface (GUI) S7-S8. If either the biometric or PIN authentication fail, the smart card may allow a limited number of subsequent tries and then will terminate the transaction if no positive authentication is received S6. Further, the smart card may lock the card if the number of attempts to access the card exceeds a predetermined number.

Once the smart card is accessed, the customer decides which account he wishes to use for the purchase S9. By way of the GUI, the customer is able to review the memo balance file to aid in the selection of an account to be debited. Further, for an added level of security, the representations of individual accounts such as MasterCard™, Visa™, and Diners Club™, or various checking and savings accounts shown to the customer, need not represent the actual account numbers for these payment vehicles. Instead, the representations are only account identifiers and are only readable by the holder of the customer's respective accounts. Whether the account holder is the SP or a third party financial institution is irrelevant at this stage. One advantage of having the same financial institution holding each of the accounts of the customer is that it is possible for the customer to split up the payment for a particularly large purchase and utilize more than one account for the same payment. In certain of the specific examples, the merchant never sees the selected payment method and this is not his concern since he is assured through the digital signatures attached to the authorizations from the SP that he will receive payment for the full amount. The method contemplated by the invention allows this to occur without any interaction from the merchant and of course, since there is no need to pay a merchant acquirer to sort and send the payment requests, there are no added transaction costs.

After the customer has selected his method of payment and has signed the certificate with his private key, the merchant proceeds to add additional transaction data, pertaining to his payment needs to the certificate prior to sending it to the SP S10. This additional data may include the merchants financial institution routing number as well as the merchant's deposit account number and the merchant's encrypted digital signature for identification by the SP. Alternatively, the merchant's information is already attached to a payment vehicle prior to the customer adding his/her information as in the case of a web-based transaction.

When the merchant has completed the addition of his data and digitally signed the certificate, the dialing number or URL on the smart card, dials up the SP and transmits all of the certificate information thereto S11. Upon receiving the certificate, the SP will decrypt and authenticate the merchant's ID signature as well as the customer's ID information and authorize the customer's certificate in light of the purchase information S12. Authorization involves comparing the balance of the customer's requested account with the requested payment amount, in the case where the SP is also the holder of the customer's accounts S13-S14. Where the SP is not the holder of the customer's accounts, the SP uses the third party financial institutions dialing number or URL, which is found r1 in the smart card and sent with the certificate from the POS terminal, to access the customer's third party financial institution and obtain authorization to proceed with the transaction S13, S15.

Upon obtaining authorization from the third party financial institution or based on its own authorization process, the SP will send a digitally signed response to the merchant, indicating the result of the comparison S16. If the SP approves the purchase, prior to debiting the account of the customer and causing the payment to be deposited into the merchants deposit account, it will await a digitally signed confirmation from the merchant (if desired) and will proceed with the clearing and settlement procedures S18. Either upon receiving the signed authorization from the SP or upon sending their digital confirmation, the merchant will release the purchased goods to the customer, knowing that the payment will be deposited into their account by the SP S17. This release of goods may be, inter alia, electronic as in the case of Internet services, shipped in the case of tangible products, or the products may be released directly to the customer in the case of a POS transaction. Finally, the SP will pay the merchant and post the debit to the customer's account either with the SP or with the third party financial institution S19. The payment and posting steps may be accomplished through the traditional automated clearing house (ACH) channels.

This same procedure may be followed using a portable POS terminal. The difference being that the portable terminal may not necessarily, and in all likelihood, is unable to take advantage of the traditional hard-wire networks, such as the telephone lines. Instead, access to the SP may occur through a wireless connection (e.g., cordless operating at, inter alia, 900 megahertz and 2.4 gigahertz or cellular operating at approved frequencies). The portable POS terminal may be powered by a standard ac power supply from a conventional outlet or for truly mobile terminals, by a rechargeable battery. In order to cause the connection between the portable device and the SP, various local area networks (LANs), wide area networks (WANs) and cellular networks may be employed. Specific examples of wireless transaction procedures and systems are more fully described in U.S. Pat. No. 5,796,832 entitled WIRELESS TRANSACTION AND INFORMATION SYSTEM which is commonly assigned and is hereby incorporated by reference.

In a second specific example, the POS terminal is either stationary or portable but is not "on-line" in the traditional sense, such that it is connected to the SP during the transaction with the customer. Instead of using the SP to authenticate the information stored in the customer's certificate(s), the merchant does his own off-line authentication.

Figure 6:
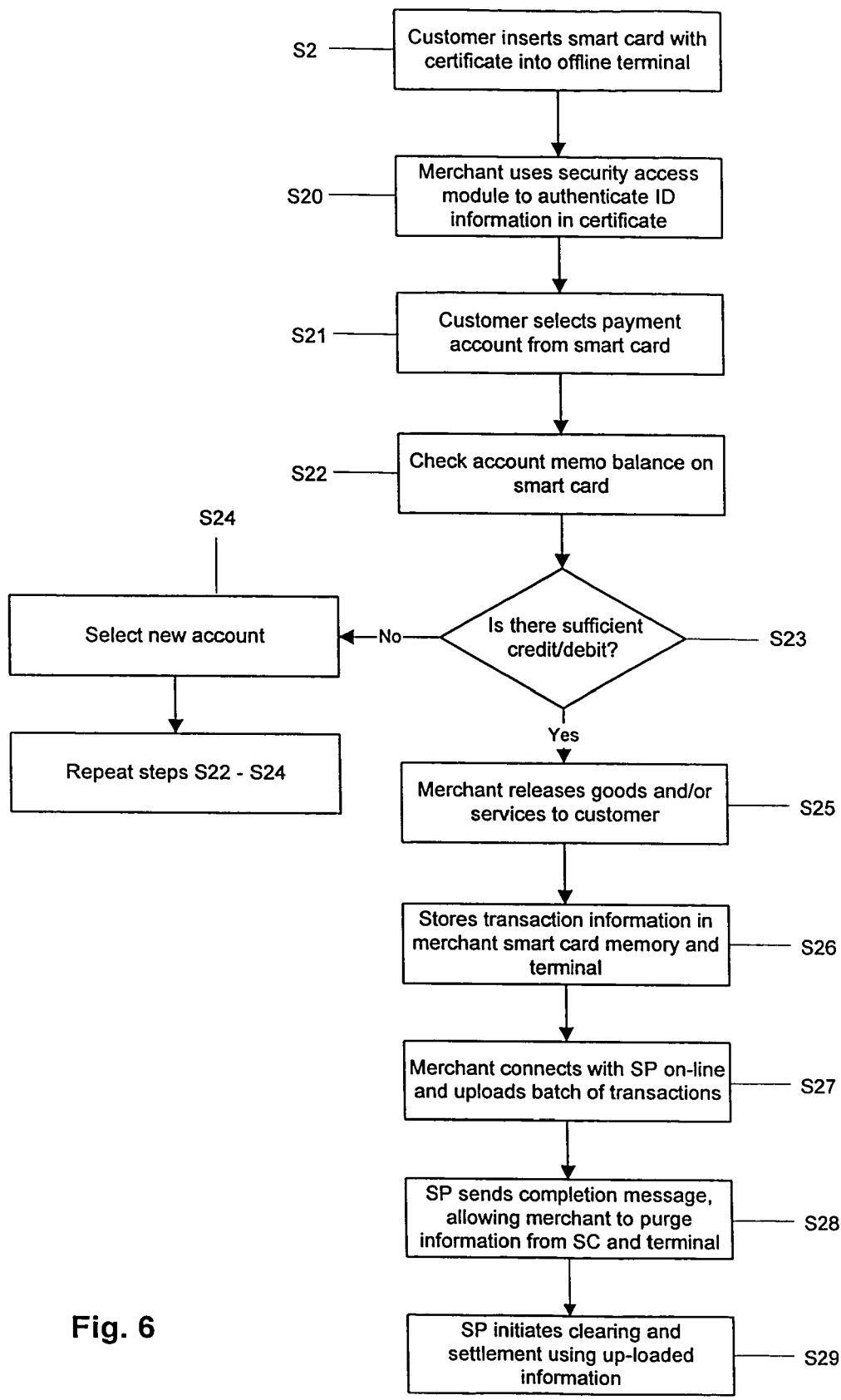
FIG. 6 is a block diagram of a second embodiment of the present invention.

Referring to FIG. 6, after the customer inserts his smart card containing a certificate into an off-line merchant terminal S2, the merchant uses a security access module (SAM) in order to decrypt the secure certificates and access the information on the customer's smart card S20. The customer then selects which account he wishes to use in the transaction S21 and if necessary, the merchant is able to view the memo balances and determine the availability of funds within the customer's chosen account S22-S24. Once a viable account has been selected, the merchant releases the purchased goods and/or services to the customer S25.

Optionally, the merchant may utilize his own terminal and smart card for storing these off-line transactions, an audit copy of the transactions, his own identification certificates containing, for example, merchant digital signatures, and dialing numbers and URLs for appropriate financial institutions and/or SPs S26. The merchant may store the transactions from, for example, a single day, in aggregate or summarized form on his smart card, and in transaction specific form in the merchant terminal memory. At a time convenient for the merchant, the merchant goes on-line (e.g., direct dial or Internet) and utilizes his smart card and/or terminal to up-load batches of transactions to the SPs S27. Once the batch of transactions is received by the SP and processed, the SP returns a completion message, allowing the merchant to purge the stored information from the smart card and the merchant terminal S28. The SP then may proceed with the clearing and settlement procedures S29.

In a third specific example, a customer accesses a merchant website or webpage via his PC. The customer decides to purchase an item and is directed via the webpage to enter appropriate purchasing data. The customer inserts his SP issued smart card, containing the information certificates into a smart card reader plug-in attached to his PC. If the merchant is a participant in the certificate-based open payment transaction system, the merchant bank's routing number and the account therein which the merchant wishes to have credited, will automatically be added to the purchasing data entered by the customer. The customer proceeds to enter the purchasing information into the webpage order form, selecting the appropriate method of payment, e.g., credit or debit, and purchase price. When the order form is complete, the customer digitally signs the purchasing information with his private key and attaches the certificate from the smart card to the purchasing information and executes the transmit step (e.g., selecting "send"), resulting in the form being sent over the network to the SP. The SP authorizes the customer's purchase, either through a comparison with its' own account records or by contacting the third party financial institution holding the customer's accounts and receiving authorization. The SP digitally signs the order and sends it to the merchant, who decrypts the SP's signature and sends confirmation back to the SP and the customer, attaching the merchant's digital signature. The SP proceeds to pay the merchant and post the debit to the customer's chosen account and generally institute clearing and settlement procedures.

In a fourth specific example, a customer uses his SP issued smart card to make a purchase through a telephone, either conventional or wireless, where the telephone is equipped with a smart card reader. In this case, the conventional alpha-numeric keypad may be used to enter data or verbal data may be entered where an appropriate voice response unit (VRU) and/or voice recognition unit is available. The entrance of the purchase data through either the keypad or vocally, combined with the electronic data from the smart card, allows the customer to make purchases with virtually the same ease as if he were sitting at his PC and filling in a webpage or standing at a POS terminal providing information through a keypad or touchscreen.

To further facilitate a wireless or cellular embodiment of the fourth specific example, the certificate issued by the service provider may include multiple types of identifiers, for use with the server of the service provider as well as the customer's third party financial institution. For example, the certificate might include a first identification number, used by the service provider to identify the individual, and a second identification number, such as an encrypted PIN, for use with the customer's third party financial institution during the authorization process. In the situation where the SP does not actually hold the accounts of the customer and thus can not actually authorize a transaction, the SP can use the encrypted PIN found in the certificate to access the third party financial institution over the conventional authorization channels, such as the ATM lines. The encrypted PIN is part of the certificate issued by the SP to the third party financial institution's customer on behalf of the third party financial institution. All of this identifying information and transaction facilitating information is secure since it is part of the encrypted message identified by the certificate, readable only by the SP who holds the matching public key. Further, if the card itself is PIN-locked or biometrically locked, there is an added level of security.

In each of the specific examples described above, there is a public-private key security feature in place that protects the important financial information of both the customer and the merchant. The system allows each of the involved parties, e.g., customer, merchant, SP, third party financial institution, to utilize public keys to decrypt digital signatures for ID authentication. By using representative account identifiers instead of the actual account numbers or by routing the customers information through the SP, without ever needing to pass it through the merchant, the information remains within the knowledge of only a limited number of parties.

There are multiple levels of security realizable using the methods and systems of the current embodiments. Depending upon the security needs of the customer, in an embodiment of the present invention, the customer generates his/her own key pair off of the issued smart card, instead of receiving the generated keys with the smart card. In this embodiment, the SP issues the smart card to the customer having a standard PIN thereon for unlocking the card, but the encryption key pairs and the certificate have yet to be generated. When the customer receives the card and unlocks the card with the PIN, using the software supplied by the SP the customer is able to generate his/her own key pair and a profile to be encrypted with a digital signature based on the private key and forwarded to the SP along with the attached public key for formation of a service provider-backed certificate. A profile contains information such as name, address, social security number, birthdate, etc. This customer-key generation embodiment limits the number of entities who are privy to both the public and private key and consequently this embodiment provides the maximum amount of security. In an alternative embodiment, the key pair is generated by the SP and provided with the customer profile based certificate loaded onto the smart card.

Since the issue of security is of utmost importance when transmitting personal financial information over public or quasi-public networks, it is also possible to have the SP issue a certified smart card, having, in addition to the electronic memory, a magnetic memory wherein, there is a one-time use amount of credit or debit attached thereto. A description of a multi-technology smart card may be found in the commonly assigned co-pending application Ser. No. 09/274,462 entitled "METHOD AND SYSTEM FOR REMOTE BANKING WITH A MULTI-MEMORY TECHNOLOGY SMART CARD" filed Mar. 22, 1999, incorporated herein by reference. If this option is selected by the customer, they can instruct the SP to put into the magnetic memory of the smart card, an amount of credit related to say, the customer's MasterCard™ account held by the SP or a customer's third party financial institution. Further, the smart card may be programmed U to automatically erase the particular track of the magnetic memory which housed the credit information, after it has been selected by the customer for use in a purchasing transaction. Consequently, there is limited risk that someone could tap into the network or that a trusted party could misuse this erasable information since the smart card does not allow for repeat uses of the information, once it has been transmitted into a network.

In order to facilitate the reading of the electronic memory and the magnetic memory for purposes of the one-time use feature or in some instances and the reading of an optical memory housed on the smart card, the customer and/or merchant will require various types of readers. In commonly assigned, co-pending application serial number 09/271,206 filed Mar. 17, 1999 entitled "IMPROVED APPARATUS AND SYSTEM FOR OPTICAL CARD READING AND METHOD OF USE," incorporated herein by reference, there is described a read/write device that allows for the reading of information off of any one of an optical, electronic, and magnetic memory found on a single smart card and is hereby incorporated by reference. Further, there are currently available, magnetic memory reader plug-ins, to be used in conjunction with a PC, PDA, set-top box or other terminal, having the appropriate compatible port.

Referring to FIGS. 7a-7d, various terminals which may be used in practicing the invention are illustrated. FIG. 7a is a cellular phone 72 having thereon a display/output component 82 for viewing information that is retrieved from the smart card 10 and a keypad/input component 73 for entering information. The cellular phone 72 may be used for wireless transactions. In order to read information from the smart card 10, there is a smart card reader plug-in 74 that is compatible with, for example, the docking port 71 of the cellular phone 72. It should be noted at this point that for each of the terminals shown in FIGS. 7a-7d, the smart card reader may be either a compatible plug-in component for use with an existing port or the reader may be an internal component of the terminal.

FIG. 7b illustrates a generic POS terminal 76 which may be used for either off-line or on-line transactions. As with the cellular phone 72, the POS terminal 76 has a display/output component 82 and a keypad/input component 73. Further, in this example, the POS terminal 76 has both a swipe reader component 80 and an internal smart card reader 78. When used on-line, an Internet or telephone connection may be provided through an appropriate cable 81.

FIG. 7c illustrates a PC 86 which is connected to the Internet via cable 81 such that a user may browse through merchant websites via the display 82. The PC 86 is compatible with a smart card reader plug-in 74 (or alternately, as discussed above, the PC could have a separate internal device for reading smart cards). After inserting the smart card 10 into the appropriate reader, the input/keyboard component 73 or a conventional mouse 75, may be used to provide transaction data to an order form on the website and to send the information to the SP.

Finally, in FIG. 7d, a generic PDA 90 is illustrated, having a display/output component 82 and an input/keypad component 73, in addition to a smart card reader plug-in 74 for use with smart card 10.

Further, the examples above limit the number of necessary parties as well as the number of transactions that are the responsibility of each of the interacting parties. The invention allows the merchant to disregard entirely the choice of payment method by the customer since the customer's accounts are each certified by the SP. There is no need for the merchant to hire a merchant acquirer to sort through numerous transactions and contact the appropriate credit card verification line for each transaction. In fact, the invention does not require use of the conventional credit transaction network at all. The SP or the SP via the customer's third party financial institution, does all of the authenticating, authorizing, crediting and debiting. The merchant need only acquire the SP's public key. In the case of non payment, the merchant has recourse due to the SP signed transaction.

The relationship between the SP and a customer's third party financial institution may take on various levels of interaction. On a first level, the SP issues the certificates to the customer on behalf of the third party financial institution. These certificates include dialing numbers or URLs for not only the SP, but the third party financial institution as well. When the relationship between the SP and the third party financial institution is on a first level, the SP receives the initial certificate for authentication and authorization from the customer making a purchase request but, the SP only does the ID authentication. The authorization is performed by the third party financial institution via the dialing number or URL that was part of the originally issued certificate. In this case, the SP and third party financial institution have the appropriate keys for allowing digital signature and decryption between the two. Once the SP receives authorization from the third party financial institution, the SP sends the results to the merchant who proceeds with the transaction as discussed in the specific examples above.

If a second level relationship has been established between the SP and the customer's third party financial institution, the SP proceeds to do both the ID authentication as well as the authorization, without first consulting the third party financial institution. The SP may settle with the third party financial institution at some later time but, the nature of a second level relationship is that the SP is authorized and indemnified by the third party financial institution in proceeding with transaction authorization based on the customer's account information garnered from the smart card certificate.

The examples described above are merely representative of the applications contemplated by the inventors. One skilled in the art is aware of the many alternate embodiments that are within the scope of the invention.

We claim:

1. A method for facilitating a financial transaction over a first network comprising:
   issuing a locked programmable memory device to a first user, wherein the programmable memory device contains at least the following for formulating payment instructions, network address instructions for an issuer of the programmable memory device, a first user's financial account information, and an encryption program;
   unlocking the programmable memory device at the first user with a first user's predetermined personal identification number;
   programming the programmable memory device at the first user to include a first user identification profile and a private/public key pair using the encryption program;
   issuing software to a second user, wherein the software includes payment information of the second user including a second user's financial account information and further wherein the software is capable of interacting with the programmable memory device over the first network;
   forming a connection between the programmable memory device and the software;
   receiving across the connection the payment instructions;
   adding the second user's payment information to the payment instructions;
   storing the second user's payment information in a programmable memory device of the second user for settlement processing of the financial transaction along with at least one other financial transaction;
   routing the payment information and the payment instructions to an issuer utilizing the network address instructions;
   receiving the payment information and the payment instructions, wherein the issuer is capable of accessing at least one of the first user's financial account information and a second user's financial account information;
   authorizing the financial transaction by authenticating the first user and the second user; and
   providing the authorization of the financial transaction to the second user for confirmation.

2. The method according to claim 1, wherein the payment information of the second user further includes a second user's digital certificate.

3. The method according to claim 1, wherein the first network is the Internet.

4. The method according to claim 1, wherein the first network is a wireless network.

5. The method according to claim 1, wherein the network address instructions include at least one of a universal resource locator and a phone number.

6. The method according to claim 1, further including authorizing a payment amount read from the payment instructions.

7. The method according to claim 6, wherein authorizing a payment amount includes requesting via a second network authorization from a first user's financial institution that maintains the first user's financial account information.

8. The method according to claim 7, wherein the payment instructions further include an encrypted personal identification number recognizable by the first user's financial institution for accessing the first user's financial account information.

9. The method according to claim 7, wherein the second network is an ATM network.

10. The method according to claim 7, wherein the second network is the Internet.

11. The method according to claim 1, wherein the programmable memory device is a smart card.

12. The method according to claim 1, wherein the first user's financial account information includes the first user's account identifier.

13. The method according to claim 12, wherein the first user's account identifier includes at least one of an account type and an account number.

14. The method according to claim 1, wherein the first user's financial account information includes the first user's financial institution routing number.

15. The method according to claim 1, wherein the encryption program contains a private key generated by the issuer.

16. The method according to claim 1, wherein the second user's financial account information includes the second user's account identifier.

17. The method according to claim 16, wherein the second user's account identifier includes at least one of an account type and an account number.

18. The method according to claim 1, wherein the second user's financial account information includes the second user's financial institution routing number.

19. A method for performing a financial transaction comprising:
   presenting a customer with an amount due in response to a customer's product selection;
   accepting a customer's programmable memory device within a reader portion of a merchant's terminal to facilitate payment of the amount due;
   accessing a portion of the customer's programmable memory device containing payment information, wherein the payment information includes at least network address instructions for an issuer of the customer's programmable memory device, a digital certificate for identifying the customer, the customer's financial account information, an encryption program, and a customer memo balance containing updated customer account balances;
   identifying the customer through the digital certificate;
   receiving a customer's account selection;
   checking a customer's memo balance for the selected account to determine if funds therein are sufficient to pay the amount due;
   downloading the payment information from the programmable memory device to a memory portion of the merchant's terminal;
   storing the payment information from the programmable memory device in a memory portion of the merchant's terminal for settlement processing of the financial transaction along with at least one other financial transaction;
   releasing the selected product to the customer;
   uploading the payment information to the issuer of the programmable memory device for further processing and settlement of the financial transaction.

20. The method according to claim 19, wherein the terminal is wireless.

21. The method according to claim 19, further comprising:
receiving verification from the issuer of the programmable memory device that the financial transaction is authorized; and
updating a merchant transaction log in the memory portion of the terminal to reflect authorization of the financial transaction by the issuer of the programmable memory device.

22. A system for facilitating a financial transaction comprising:
a first programmable memory device issued to a customer including
 (a) at least one processor;
 (b) a digital certificate for identifying the customer;
 (c) the customer's financial account information;
 (d) network addressing instructions for at least the issuer of the first programmable memory device;
 (e) an encryption program for encrypting at least (b) and (c) wherein the encryption program is employed by the customer after issuance of the first programmable memory device thereto for generating a private/public key pair; and
 (f) at least one re-writable memory configured to track information related to the financial transaction;
a terminal for reading information from the first programmable memory device to facilitate a payment from at least one of a customer's financial accounts;
a server for receiving information from the terminal read from the first programmable memory device and authorizing payment from at least one of the customer's financial accounts; and
a second programmable memory device issued to a merchant for storing information related to a plurality of financial transactions from a plurality of customers, wherein the programmable memory device is connectable to a network for processing the plurality of financial transactions, wherein the programmable memory device is a smart card or a terminal.

* * * * *